(No Model.)
G. B. SIEGENTHALER.
BROILER.
No. 305,343. Patented Sept. 16, 1884.
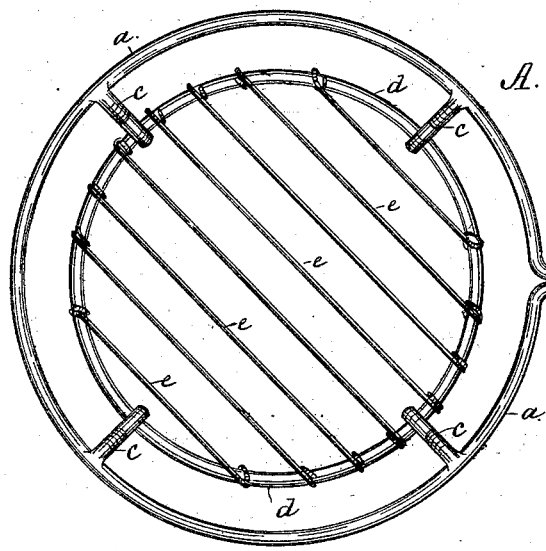
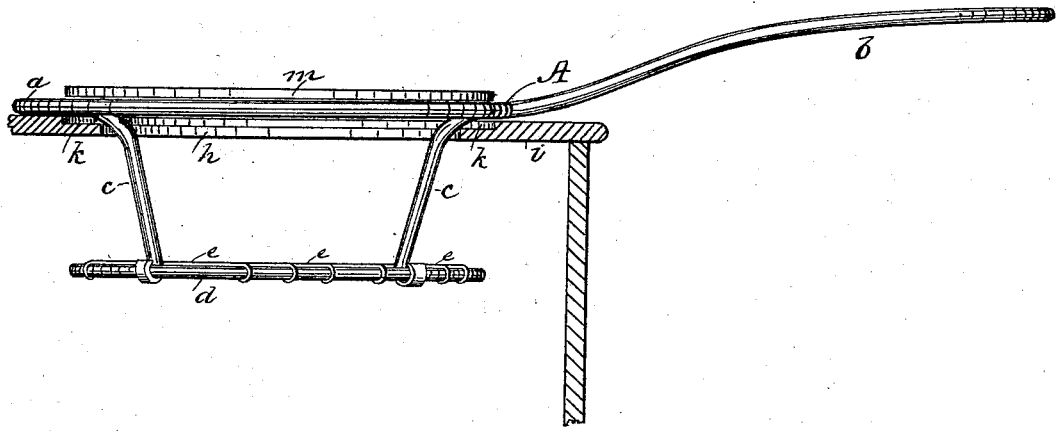
WITNESSES:
W. W. Hollingsworth
Wm Read
INVENTOR:
Geo. B. Siegenthaler
BY Munn
ATTORNEYS.

UNITED STATES PATENT OFFICE.

GEORGE B. SIEGENTHALER, OF WOOSTER, OHIO.

BROILER.

SPECIFICATION forming part of Letters Patent No. 305,343, dated September 16, 1884.

Application filed November 6, 1883. (No model.)

*To all whom it may concern:*

Be it known that I, GEORGE B. SIEGENTHALER, a citizen of the United States, residing at Wooster, in the county of Wayne and State of Ohio, have invented certain new and useful Improvements in Broilers, of which the following is a description, reference being had to the accompanying drawings and letters of reference marked thereon, in which—

Figure 1 is a top view of my improved broiler, and Fig. 2 is a side view of the broiler inserted in a pot-hole in the top plate of a stove with the cover on.

My invention relates to improvements in meat-broilers; and it consists in the peculiar construction and arrangement of the parts, as hereinafter more fully set forth, and pointed out in the claim.

Referring to the drawings, A represents my improved broiler, made of iron or other suitable metal or wire, and intended for use in an ordinary cooking-stove.

$a$ represents a ring, of slightly greater diameter than the hole in the stove in which the broiler is inserted, so that the ring $a$ will rest on the top plate of the stove around the stove-hole in which the broiler is inserted and support the broiler in place in the stove-hole. The ring $a$ is provided with a handle, $b$, preferably formed in one piece with the ring.

To the ring $a$ are secured several downwardly-projecting standards, $c$, bent inwardly at their upper ends. The lower ends of the standards $c$ are secured to a ring, $d$, of less diameter than the upper ring, $a$, so that the broiler can be inserted in a stove-hole and be supported in place by the upper ring, $a$, resting on the top face of the stove near and around the stove-hole in which the broiler is inserted.

$e\ e$ represent bars, made of wire or other suitable material, secured at their ends to the lower ring, $d$, on which the meat to be broiled is placed.

In my construction of broiler the meat to be broiled or the bread to be toasted is brought nearer the fire than in the ordinary construction of broiler placed on the top plate of the stove over a stove-hole, thus requiring less fuel and broiling the meat faster, because it is in close proximity to the fire, and making the meat more tender and juicy. The upper ring is sufficiently larger than the lower ring to enable the former to catch on the stove-top around the hole in which the broiler is inserted. The broiler may be covered by an ordinary pot-lid placed over the stove-hole, thus keeping all the smoke and unpleasant odors in the stove to be carried therefrom by the smoke-pipe, and thus preventing their egress into the room containing the stove. There may be any desired number of uprights or standards connecting the two rings, and the uprights may be made of different lengths to suit the stove.

In Fig. 2 I have shown my improved broiler inserted in a pot-hole in the top plate of a stove with the cover on, in which figure $h$ represents the pot-hole in the top plate, $i$, of a stove, having a circular recess, K, surrounding the pot-hole, and $m$ represents the cover on.

What I claim as new, and desire to secure by Letters Patent, is—

The improved broiler herein described, consisting of the upper ring, $a$, provided with a handle, $b$, lower ring, $d$, of less diameter than the upper ring, $a$, and provided with bars $e$, having their ends secured to the lower ring, and standards $c$, bent inwardly at their upper ends and secured at their ends to the upper and lower rings, substantially as shown and described.

GEORGE B. SIEGENTHALER.

Witnesses:
R. S. ROLLER,
W. S. WILSON.